United States Patent

[11] 3,587,652

| [72] | Inventor | Casimer F. Remus |
| | | Tunkhannock, Pa. |
| [21] | Appl. No. | 844,503 |
| [22] | Filed | July 24, 1969 |
| [45] | Patented | June 28, 1971 |
| [73] | Assignee | The Bendix Corporation |

[54] SNUBBER FOR A FLUID PRESSURE LINE
14 Claims, 2 Drawing Figs.

[52] U.S. Cl. .................................................... 138/26,
138/43, 138/45, 138/46
[51] Int. Cl. ...................................................... F16l 55/04,
F15d 1/02
[50] Field of Search .......................................... 138/26, 43,
45, 46; 137/625.3

[56] References Cited
UNITED STATES PATENTS

| 1,310,507 | 7/1919 | Scott | 138/46X |
| 1,857,992 | 5/1932 | Wilkes | 138/46X |
| 1,871,287 | 8/1932 | Whittaker | 138/46 |
| 2,515,394 | 7/1950 | Clarkson | 138/26 |
| 2,838,072 | 6/1958 | Stumm | 138/26 |
| 2,859,768 | 11/1958 | Teague | 138/46X |

*Primary Examiner*—Herbert F. Ross
*Attorneys*—S. H. Hartz and Plante, Hartz, Smith & Thompson

ABSTRACT: A snubber for avoiding oscillation and transients with sudden changes in pressure in a fluid pressure line having a restriction in the flow path to damp sudden changes in fluid pressure, and temperature responsive means for changing the restriction in the flow path with changes in temperature to compensate for changes in viscosity of the fluid.

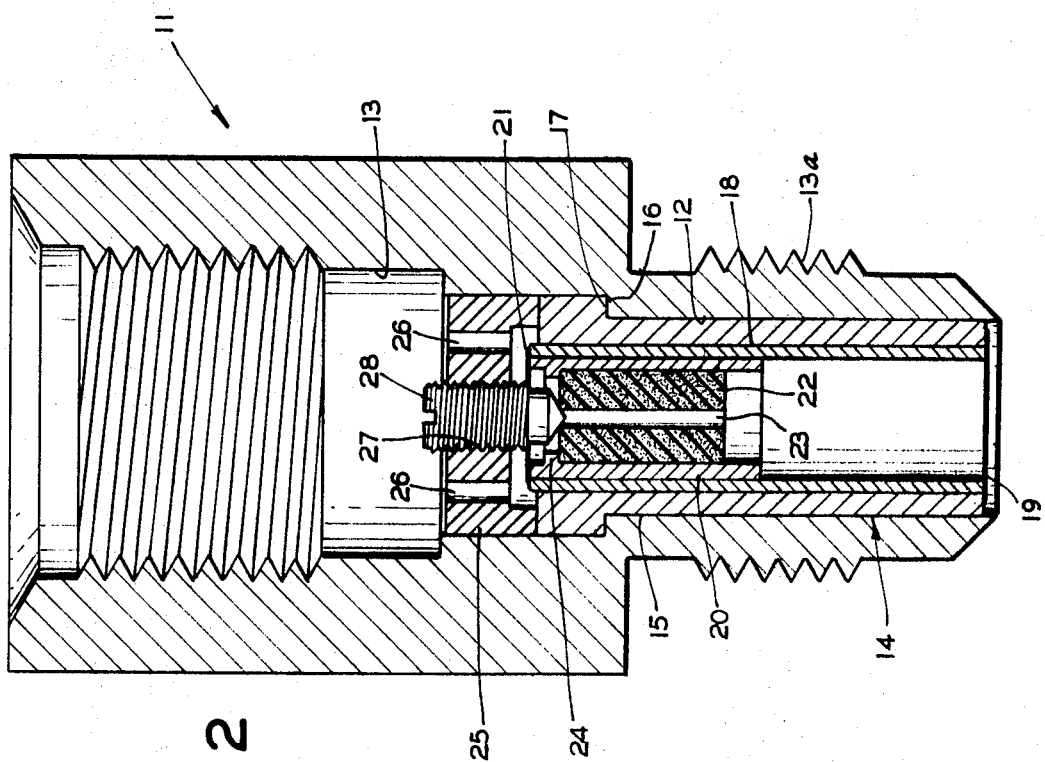
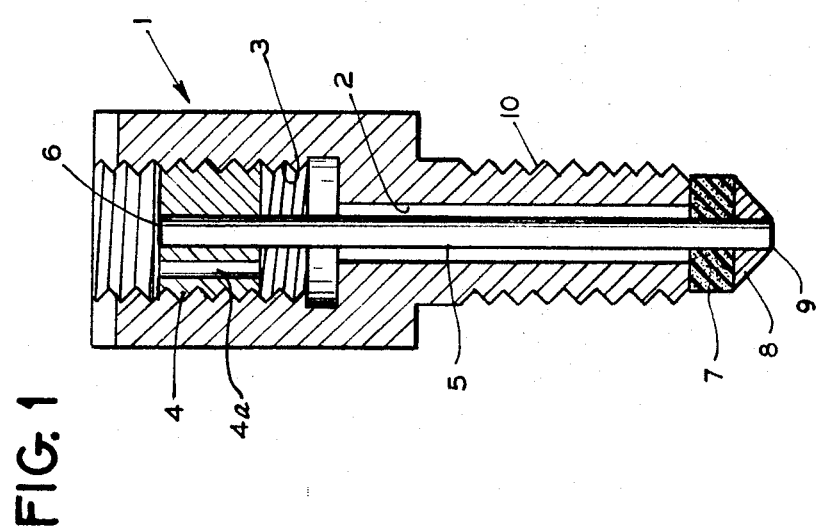
INVENTOR.
CASIMER F. REMUS
BY
ATTORNEY

SNUBBER FOR A FLUID PRESSURE LINE

The invention relates to pressure equipment and more particularly to a snubber for avoiding oscillations and transients caused by sudden changes in pressure in a fluid pressure line.

Snubbers as used heretofore were satisfactory for avoiding oscillations and transients in a pressure line maintained at a constant temperature, but when the temperature varied over a considerable range, as in present aircraft, the damping time of the system changed considerably because of the change in viscosity of the fluid. Snubbers as used heretofore were not temperature sensitive and were not satisfactory under the conditions referred to above.

One object of the present invention is to provide a snubber for a fluid pressure line which is temperature sensitive and avoids oscillations and transients over a substantial temperature range.

Another object of the invention is to use materials having different thermal coefficients of expansion to detect changes in temperatures to compensate for changes in viscosity of the fluid.

Another object of the invention is to provide a snubber which compensates for changes in viscosity of the fluid due to changes in temperature so that the damping time of the system is constant over a substantial temperature range.

The invention contemplates a snubber for avoiding oscillations and transients caused by sudden changes in pressure in a fluid pressure line, comprising a body having a fluid flow path therein, means for providing a restriction in the flow path to damp sudden changes in fluid pressure, and means responsive to changes in temperature for changing the restriction to compensate for changes in viscosity of the fluid.

The foregoing and other objects and advantages of the invention will appear more fully hereinafter from a consideration of the detailed description which follows, taken together with the accompanying drawing wherein two embodiments of the invention are illustrated by way of example.

Referring to the drawing, FIG. 1 is an axial sectional view of a snubber constructed according to the invention for use in fluid pressure lines where the maximum pressure is relatively low, and FIG. 2 is an axial sectional view of a snubber constructed according to the invention for use in fluid pressure lines where the maximum pressure is relatively high.

The drawings show novel snubbers constructed according to the invention which may be inserted in fluid pressure lines between a pressure source to be measured and a pressure transmitter which may be of conventional type, such as a Bourdon tube operating a synchro to provide an electrical signal corresponding to the pressure of the source. The snubber shown in FIG. 1 is especially adapted for use in pressure systems of relatively low maximum pressure of 500 p.s.i. for example, and the snubber shown in FIG. 2 is adapted for use in pressure systems of relatively high maximum pressure of 5000 p.s.i. The snubbers avoid oscillations and transient signals when the pressure changes suddenly, and step inputs are reduced to ramp functions.

The snubber shown in FIG. 1 comprises a body 1 made of a material having a relatively high thermal coefficient of expansion. Body 1 has an axial bore 2 with an enlarged portion 3 at one end threaded for connection to a pressure line and to receive the adjusting screw 4 having an orifice 4a. The other end of body 1 is reduced in diameter and externally threaded at 10 for connection to the pressure line or to a pressure transmitter or other suitable equipment.

A wire member 5 having a diameter smaller than the diameter of bore 2 is positioned axially in the bore and is brazed at 6 to adjusting screw 4. Wire member 5 is made of a material having a relatively low thermal coefficient of expansion. An annular porous member 7 is assembled on wire member 5 at the end of bore 2 adjacent body 1. A cap 8 is installed at the end of wire member 5 adjacent porous member 7 and is brazed to wire member 5 at 9. Fluid flows through orifice 4a in adjusting screw 4, through bore 2 along wire member 5, and through porous member 7.

Screw 4 is adjusted normally to restrict the flow path of the fluid to an extent necessary to achieve the necessary damping time for sudden changes in fluid pressure. Screw 4 usually is adjusted so that at the highest temperature at which the pressure system is used porous member 7 abuts body 1 and all the fluid flows through porous member 7. As the temperature decreases the relative lengths of body 1 and wire member 5 change so that porous member 7 moves away from body 1 and fluid also flows through this opening to provide a pressure drop across porous member 7 to compensate for the change in viscosity of the fluid due to change in temperature. This arrangement enables the damping time of the system to remain substantially constant when the viscosity of the fluid changes considerably due to changes in temperature.

The novel snubber constructed according to the invention and shown in FIG. 2 comprises a body 11 having an axial bore 12 with an enlarged portion 13 at one end threaded for connection to a pressure line. The opposite end of the body is reduced in outside diameter and the external portion also is threaded at 13a for connection to a pressure line or to a pressure transmitter or other suitable equipment. A sleeve assembly 14 is pressed into bore 12 of body 11 and comprises a sleeve 15 having a shoulder 16 abutting a shoulder 17 on body 11, a sleeve 18 positioned in sleeve 15 and brazed to sleeve 15 at 19, and a sleeve 20 positioned in sleeve 18 and brazed to sleeve 18 at 21. Sleeve 15 is made of a material having a relatively low thermal coefficient of expansion and sleeves 18 and 20 are made of material having a relatively high thermal coefficient of expansion. A cylinder 22 of porous material with an orifice 23 therethrough is pressed in sleeve 20 and one end of cylinder 22 abuts a rib 24 on sleeve 20. An annular insert 25 having oil passages 26 therein is pressed in bore 12 of body 11 into engagement with sleeve 15 of sleeve assembly 14. Insert 25 has an axial bore 27 threaded to receive an adjusting screw 28 which cooperates with porous member 22 to adjust the flow path of the fluid to an extent necessary to achieve the necessary damping time for sudden changes in fluid pressure. Fluid flows through the internally threaded end of body 1, through oil passages 26 in insert 25, through porous member 22 into orifice 23 and through sleeve 18.

Screw 28 usually is adjusted so that at the highest temperature at which the hydraulic system is used screw 28 is seated on porous member 22 and all the fluid flows through porous member 22. As the temperature decreases the relative lengths of sleeve 15 and of sleeves 18 and 20 change so that screw 28 moves away from porous member 22 and fluid also flows through this opening to provide a pressure drop across porous member 22 to compensate for the change in viscosity of the fluid due to changes in temperature. With this arrangement the damping time of the system remains substantially constant when the viscosity of the fluid changes considerably due to changes in temperature.

The snubbers described herein and constructed according to the invention are temperature sensitive and avoid oscillations and transients over a substantial temperature range. The snubbers use materials having different thermal coefficients of expansion to detect changes in temperature to compensate for changes in viscosity of the fluid. With this arrangement the snubbers compensate for changes in viscosity of the fluid due to changes in temperature so that the damping time of the system is constant over a substantial temperature range.

While two embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

I claim:

1. A snubber for avoiding oscillations and transients caused by sudden changes in pressure in a fluid pressure line, comprising a body having a fluid flow path therein, means including a porous member for providing a restriction in the flow path to damp sudden changes in fluid pressure, and means responsive to changes in fluid temperature for changing the restriction to compensate for changes in viscosity of the fluid whereby all the fluid passes through the porous member at the highest temperature, and across the porous member at the lowest temperature at which the snubber may be operated.

2. A snubber as described in claim 1 in which the temperature responsive means includes a pair of elements having different thermal coefficients of expansion for operating the restriction means.

3. A snubber as described in claim 1 in which the restriction means has means providing for a pressure drop across the porous member in accordance with changes in temperature.

4. A snubber as described in claim 3 in which the pressure dropping means includes valvelike means arranged in a parallel flow path with the porous member.

5. A snubber as described in claim 3 in which the temperature responsive means includes a pair of elements having different thermal coefficients of expansion for controlling the pressure dropping means.

6. A snubber as described in claim 4 in which the valvelike means is manually adjustable and is preset to provide a desired pressure drop over a predetermined temperature range.

7. A snubber as described in claim 1 in which the body is made of a material having one coefficient of expansion and a rodlike member having a second coefficient of expansion is positioned in the body and relative lengthwise expansion of the body and member controls the restriction means.

8. A snubber as described in claim 7 in which the restriction means has means providing for a pressure drop across the porous member in accordance with changes in temperature.

9. A snubber as described in claim 8 in which the porous member is mounted on the rodlike member, and manually adjustable means associated with the rodlike member provides for presetting the pressure drop to a desired value over a predetermined temperature range.

10. A snubber as described in claim 1 which includes a sleeve assembly positioned in the body and having sleeves of material with different coefficients of expansion, the relative lengths of the sleeves changing with the temperature for operating the restriction means.

11. A snubber as described in claim 10 in which the porous member is cylindrical and is positioned in the sleeve assembly.

12. A snubber as described in claim 11 in which the restriction means has means providing for a pressure drop across the porous member in accordance with changes in temperature and operated by the sleeve assembly.

13. A snubber as described in claim 12 in which the pressure dropping means includes valvelike means arranged in a parallel flow path with the porous member.

14. A snubber as described in claim 13 in which the valvelike means is manually adjustable and is preset to provide a desired pressure drop over a predetermined temperature range.